United States Patent Office 3,062,859 Patented Nov. 6, 1962

3,062,859
PREPARATION OF BENZENEBORONIC ESTERS
Allen L. McCloskey, Orange, Calif., assignor to United States Borax & Chemical Corporation, Los Angeles, Calif., a corporation of Nevada
No Drawing. Filed Mar. 7, 1960, Ser. No. 12,901
12 Claims. (Cl. 260—462)

This invention relates to a new and novel method for preparing benzeneboronic acid and benzeneboronic esters. Benzeneboronic acid and benzeneboronic esters have been found to be active fungicides and herbicides, and are valuable chemical intermediates. They are especially useful in processes for the manufacture of alkyl and aryl diacyloxyboranes and the synthesis of certain boric acid esters. However, due to the high cost, low efficiency and difficulties involved in the prior art methods of preparing benzeneboronic acid and esters, they have not been commercially feasible.

Therefore, it is the principal object of the present invention to provide a new and novel process for the preparation of benzeneboronic acid and benzeneboronic esters which is commercially desirable.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises the method of preparing a compound having the general formula:

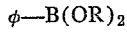

which comprises reacting a compound having the general formula:

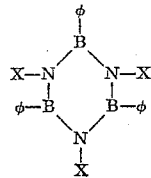

with a compound having the general formula

ROH where $\phi$ is the phenyl radical, X is a radical selected from the group consisting of hydrogen and methyl and R is a radical selected from the group consisting of hydrogen, phenyl, and alkyl radicals containing from 1 to 5 carbon atoms.

From the foregoing broadly stated paragraph, it will be seen that I have provided a new and novel process for producing benzeneboronic acid and esters of benzeneboronic acid which is extremely simple and economically desirable. Thus, when benzeneboronic acid is desired, a B-phenylborazole is used and the reaction takes place in water. When an ester of benzeneboronic acid is desired, then a B-phenylborazole is allowed to react with a phenol or an alcohol containing from 1 to 5 carbon atoms.

The foregoing reactions can be readily illustrated by the following equation:

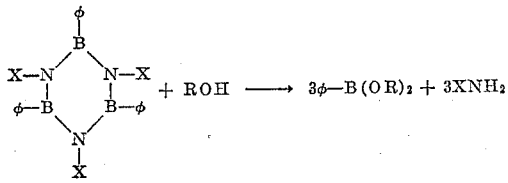

where $\phi$ is the phenyl radical, X is a radical selected from the group consisting of hydrogen and methyl and R is a radical selected from the group consisting of hydrogen, phenyl and alkyl radicals containing from 1 to 5 carbon atoms. It will also be seen from the above equation that a second compound, methylamine or ammonia, is formed and both being gases are easily separated from the desired benzeneboronic acid or ester.

While the reactions of the present process proceed as described, I have found that the addition of an acid to the reaction causes a marked increase in the reaction rate as well as to form a salt with the by-product ammonia or amine. The present process is responsive to a general acid catalysis, catalytic amounts of any acid will markedly increase the rate of reaction. While as stated any acid is able to speed up the rate of reaction for economy's sake, I prefer to use the readily available mineral acids such as hydrochloric, sulfuric, nitric, etc.

As stated above, the present process is responsive to catalytic amounts of acid, however, I have additionally found that when the acid is used in stoichiometric amounts there is an added benefit obtained. As described above, the present invention comprises a method for producing benzeneboronic acid or its esters from B-phenylborazole; this is accomplished by breaking the borazole ring and eliminating ammonia or an amine. If the acid is present in the stoichiometric amount necessary to react with the ammonia or amine formed during the reaction, the acid will form a salt with the ammonia or amine and thus prevent them from forming a complex with the benzeneboronic acid or ester. While it is entirely possible to break a benzeneboronic complex of ammonia or amine, it requires an extra production step and sometimes involves the use of extreme conditions to break the complex. Use of the acid in stoichiometric amounts to react with the ammonia or amine forestalls the possibility of the complex forming.

So that the present invention can be more easily understood, the following examples are given:

The apparatus used in the following examples was a two-liter round-bottomed flask fitted with a mechanical stirrer and an escape column for the ammonia or methylamine produced in the reaction.

I 309 grams (1 mole) of B-triphenylborazole was put into the flask containing 108 grams (6 moles) of water, with constant stirring. Ammonia was gradually given off, and when substantially all of the ammonia was evolved, the resultant product, about 338 grams which crystallized from the water, was analyzed. Chemical analysis showed the product to be substantially pure benzeneboronic acid.

Found: B=8.81%

Theory benzeneboronic acid: B=8.88%

II

Example I was repeated except that an equivalent amount of hydrochloric acid was added to the reactants in the flask. The reaction took place substantially immediately and resulted in about a 92.5% yield of benzeneboronic acid. Analysis of the final benzeneboronic acid was as follows:

Found: B=8.76%

III 351 grams (1 mole) of B-triphenyl-N-trimethylborazole and 108 grams (6 moles) of water and an equivalent amount of hydrochloric acid were placed in the flask, with stirring. The reaction took place almost immediately. The resultant product was a 96.1% yield of benzeneboronic acid.

Found: B=8.82%

IV 309 grams (1 mole) of B-triphenylborazole was reacted (with stirring) with 564 grams (6 moles) of phenol and an equivalent of dry hydrogen chloride. The resultant diphenylbenzeneboronate weighed 680 grams (94.3% yield) after distillation. Chemical analysis was as follows:

Found: B=3.89%

Theory diphenylbenzeneboronate: B=3.95%

V 351 grams (1 mole) of B-triphenyl-N-trimethylborazole was reacted (with stirring) with 276 grams (6 moles) of ethanol and an equivalent amount of dry hydrogen chloride. The distilled product weighed 516 grams (96.6% yield) and proved to be diethyl benzeneboronate. Data derived from chemical analysis were as follows:

Found: B=6.01%

Theory diethylbenzeneboronate: B=6.08%

VI 351 grams (1 mole) of B-triphenyl-N-trimethylborazole was reacted (with stirring) with 44 grams of butanol (6 moles) and an equivalent amount of dry hydrogen chloride. The distilled product weighed 676 grams (96.3% yield) and proved to be dibutyl benzeneboronate. Data derived from chemical analyses were as follows:

Found: B=4.58%

Theory dibutyl benzeneboronate: B=4.63%

From the foregoing examples, it will be seen that the present reaction requires only conventional apparatus and techniques well known to the art. From an economic viewpoint it is best to use stoichiometric amounts of reactants, however, excess amounts of reactants will not hinder the reaction.

While the foregoing examples demonstrate the use of hydrochloric acid as the catalytic agent, it is again iterated that any other acid can be substituted in equivalent amounts for the hydrochloric acid and equal results obtained.

As stated previously, benzeneboronic acid and its esters are effective as herbicides. They may be applied alone or in combination with other organic and inorganic herbicidal materials. The benzeneboronic acid and/or esters are applied to soil or directly to weeds in substantially the same amounts and using the same methods as used with any of the well known organic herbicides. Benzeneboronic acid and its esters are particularly effective when incorporated with borates as described in U.S. Patent 2,904,423.

Other modes of applying the principle of the invention may be employed provided the features as stated in the following claims, or the equivalent of such, be employed.

I, therefore, particularly point out and claim as my invention:

1. The method of preparing benzeneboronic esters which comprises reacting a compound having the general formula:

ROH with a compound having the general formula:

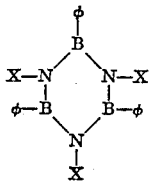

where R is a radical selected from the group consisting of phenyl and alkyl radicals containing from 1 to 5 carbon atoms, $\phi$ is the phenyl radical and X is a radical selected from the group consisting of hydrogen and methyl and distilling the benzeneboronic ester from the reaction mass.

2. The method of claim 1 which comprises conducting said reaction in the presence of at least a catalytic amount of an acid.

3. The method of claim 1 wherein said acid is hydrochloric acid.

4. The method of producing diphenylbenzeneboronate which comprises reacting B-triphenyl-N-trimethylborazole with phenol in the presence of at least a catalytic amount of an acid and distilling said benzeneboronate from the reaction mass.

5. The method of producing diethylbenzeneboronate which comprises reacting B-triphenyl-N-trimethylborazole with ethanol in the presence of at least a catalytic amount of an acid and distilling said benzeneboronate from the reaction mass.

6. The method of producing dibutylbenzeneboronate which comprises reacting B-triphenyl-N-trimethylborazole with butanol in the presence of at least a catalytic amount of an acid and distilling said benzeneboronate from the reaction mass.

7. The method of preparing benzeneboronic esters which comprises reacting a compound having the general formula ROH with a compound having the general formula:

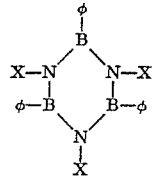

where R is an alkyl radical containing from 1 to 5 carbon atoms, $\phi$ is the phenyl radical and X is a radical selected from the group consisting of hydrogen and methyl and distilling said benzeneboronic ester from the reaction mass.

8. The method of claim 7 which comprises conducting said reaction in the presence of at least a catalytic amount of an acid.

9. The method of claim 7 wherein the reaction is conducted in the presence of at least a catalytic amount of hydrochloric acid.

10. The method of preparing benzeneboronic esters which comprises reacting phenol with a compound having the general formula:

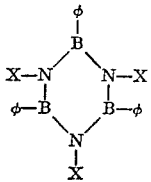

where X is a radical selected from the group consisting of hydrogen and methyl and $\phi$ is the phenyl radical and distilling said benzeneboronic ester from the reaction mass.

11. The method of claim 10 which comprises conducting said reaction in the presence of at least a catalytic amount of an acid.

12. The method of claim 10 wherein the reaction is conducted in the presence of at least a catalytic amount of hydrochloric acid.

References Cited in the file of this patent

Groszos et al.: Journal American Chemical Society, vol. 80, pages 1357 to 1360 (1958).

Haworth et al.: J. Am. Chem. Soc., vol. 81, pp. 842–4 (Feb. 20, 1959).

UNITED STATES PATENT OFFICE
CERTIFICATE OF CORRECTION

Patent No. 3,062,859 November 6, 1962

Allen L. McCloskey

It is hereby certified that error appears in the above numbered patent requiring correction and that the said Letters Patent should read as corrected below.

Column 3, line 27, for "44 grams" read -- 444 grams --.

Signed and sealed this 9th day of April 1963.

(SEAL)
Attest:

ESTON G. JOHNSON
Attesting Officer

DAVID L. LADD
Commissioner of Patents